(12) United States Patent
Uhl et al.

(10) Patent No.: US 7,423,806 B2
(45) Date of Patent: Sep. 9, 2008

(54) MICROSCOPE SYSTEM WITH A BEAM HUB UNIT HAVING A BEAM MULTIPLEXER FOR ALTERNATIVELY SELECTING BEAM PORTS

(75) Inventors: Rainer Uhl, Graefelfing (DE); Andreas Kantwerg, Planegg (DE)

(73) Assignee: Till I.D. GmbH, Graefelfing (DE)

( * ) Notice: Subject to any disclaimer, the term of this patent is extended or adjusted under 35 U.S.C. 154(b) by 115 days.

(21) Appl. No.: 10/547,379

(22) PCT Filed: Feb. 19, 2004

(86) PCT No.: PCT/EP2004/001638

§ 371 (c)(1),
(2), (4) Date: Aug. 29, 2005

(87) PCT Pub. No.: WO2004/077121

PCT Pub. Date: Sep. 10, 2004

(65) Prior Publication Data

US 2006/0181766 A1    Aug. 17, 2006

(30) Foreign Application Priority Data

Feb. 28, 2003  (DE)  ............................... 103 09 138

(51) Int. Cl.
*G02B 21/00*  (2006.01)
(52) U.S. Cl. ..................... 359/368; 359/384; 359/629; 359/636; 359/638
(58) Field of Classification Search ................ 359/363, 359/381, 384
See application file for complete search history.

(56) References Cited

U.S. PATENT DOCUMENTS

| | | | |
|---|---|---|---|
| 4,685,776 A | | 8/1987 | Inoue et al. |
| 5,506,725 A | * | 4/1996 | Koike et al. ................. 359/388 |
| 5,706,137 A | * | 1/1998 | Kelly .......................... 359/633 |
| 5,777,783 A | | 7/1998 | Endou et al. |
| 6,097,538 A | * | 8/2000 | Watanabe et al. ........... 359/390 |
| 6,323,998 B1 | * | 11/2001 | Kawano et al. ............. 359/434 |
| 6,392,796 B1 | | 5/2002 | Schwab et al. |
| 6,643,070 B2 | | 11/2003 | Déverin et al. |
| 6,661,572 B2 | | 12/2003 | Spink et al. |
| 2001/0008462 A1 | * | 7/2001 | Takeuchi .................... 359/385 |

* cited by examiner

*Primary Examiner*—Stephone B. Allen
*Assistant Examiner*—Lee Fineman
(74) *Attorney, Agent, or Firm*—David S. Safran

(57) ABSTRACT

A microscope system having an objective lens (10) defining a central optical axis (14) of the microscope system; an optical beam hub unit (18, 20) having a center coinciding with the central optical axis, a plurality of optical beam ports (24, 26, 30, 32; 214) arranged radially around the central optical axis, a beam multiplexer system (22, 28, 222) arranged in the center of the hub unit, and a device for rotating the beam multiplexer system around the central optical axis for alternatively selecting at least one of the beam ports. The beam ports include at least two elements selected any one of input ports, output ports and dual input/output ports.

44 Claims, 12 Drawing Sheets

MICROSCOPE SYSTEM WITH A BEAM HUB UNIT HAVING A BEAM MULTIPLEXER FOR ALTERNATIVELY SELECTING BEAM PORTS

BACKGROUND OF THE INVENTION

1. Field of the Invention

The present invention relates to a microscope system, and more particularly, to a microscope system comprising at least one optical beam hub unit for alternatively selecting one beam port out of a plurality of optical beam ports.

2. Description of Related Art

An optical microscope serves to illuminate and simultaneously view a sample by an optical arrangement. In the case of an epi-fluorescence set-up, viewing is achieved by at least partially utilizing the same optical arrangement as is used for illumination. Observation is accomplished either directly by the eye of the operator, or by a detector and a subsequent device for recording the measurement signals. The sample is illuminated either on its whole area and observation occurs by a two-dimensional sensor or the sample is illuminated only partially and the illuminated partial area of the sample is moved optically across the sample. In the latter case, the image then is composed of partial images, which have been sequentially recorded during the scanning action.

Besides their central optical element, the objective lens, microscopes usually comprise additional optical elements, such as tube-lenses, mirrors, beam splitters and filters. For example, for performing epi-fluorescence microscopy dichroic beam splitters are usually employed for unifying or separating the illumination beam and the measurement beam. Usually longpass filters are used for this purpose, which reflect the excitation light having shorter wavelengths, and which transmit the emitted light having longer wavelengths. Beam splitters are usually brought into the beam-path by the translational movement of a filter slider or by the rotational movement of a filter carousel. However, such sliders or carousels also may serve for placing other optical elements, such as lenses, mirrors etc., into the optical beam.

U.S. Pat. No. 6,392,796 relates to a changeover system for optical components, such as filters, reflectors, polarizers and lens systems of a microscope system. The changeover system is rotatable, and the elements carrying the optical components are designed such that each optical component may be fixed in its place in the changeover system in two distinct orientations, which differ by a rotation by 180 degrees.

U.S. Pat. No. 5,777,783 relates to a microscope system, wherein a beam splitter block consisting of the differently oriented beam splitters is linearly movable by a slider which allows to place one of the beam splitters into the central optical axis defined by an objective lens in order to deflect the image beam of the microscope system towards one of three image detectors, whereby each beam splitter serves as a beam multiplexer element for selecting one of the detectors. Similar microscope systems are also described in U.S. Pat. No. 4,685, 776 and laid open Japanese patent application 08101346.

SUMMARY OF THE INVENTION

It is an object of the present invention to provide for a microscope system which is very flexible and which allows for an easy and convenient selection of at least one optical beam port out of a plurality of optical beam ports selected from the group consisting of input ports, output ports and dual input/output ports.

It is another object of the invention to provide for a microscope system which is very flexible and which allows for an easy and convenient selection of at least one beam port out of a plurality of beam ports selected from the group consisting of input ports, output ports and dual input/output ports which are arranged on at least two different levels regarding the central optical axis of the microscope system.

The above objects are achieved by the present invention, one aspect of which is a microscope system having an objective lens defining a central optical axis of the microscope system; an optical beam hub unit having a center coinciding with the central optical axis, a plurality of optical beam ports arranged radially around the central optical axis, a beam multiplexer system arranged in the center of the hub unit, and means for rotating the beam multiplexer system around said central optical axis for alternatively selecting at least one of the beam ports; wherein said beam ports include at least two elements selected from the group consisting of input ports, output ports and dual input/output ports.

This microscope system allows a beam multiplexer system to be arranged in the center of an optical beam hub unit, whereby this center lies on the central optical axis defined by the objective lens, thus permitting easy selection of one of the beam ports of the beam hub unit by operating the means for rotating the beam multiplexer system around the central optical axis.

Another aspect of the present invention is a microscope system comprising an objective lens defining a central optical axis of the microscope system; an optical beam hub unit having a center coinciding with the central optical axis, a plurality of optical beam ports arranged radially around the central optical axis, a beam multiplexer system arranged in the center of the hub unit and means for operating the multiplexer system for alternatively selecting at least one of the beam ports; wherein the beam ports include at least one input port or at least one dual input/output port.

This microscope system enables easy selection of an input port or a dual input/output port, as opposed to the microscope system described in U.S. Pat. No. 5,777,783 wherein the beam splitter elements only serve to switch between different output ports.

Still another aspect of the present invention is a microscope system comprising an objective lens defining a central optical axis of the microscope system; a plurality of optical beam hub units, each having a center coinciding with the central optical axis, a plurality of optical beam ports arranged radially around the central optical axis, a beam multiplexer system arranged in the center of the hub unit, and means for operating said multiplexer system for alternatively selecting at least one of the beam ports; wherein the optical beam hub units are stacked along said central optical axis, and wherein the beam ports of each optical beam hub unit include at least two elements selected from the group consisting of input ports, output ports and dual input/output ports.

By providing a plurality of optical beam hub units packed along the central optical axis of the microscope system, it is possible to select beam ports which are arranged on different levels with respect to the central optical axis, thereby creating a microscope system with a particularly high flexibility.

In the following, embodiments of the invention are explained in detail by way of examples using the accompanying drawings.

BRIEF DESCRIPTION OF THE DRAWINGS

FIGS. 6A to 6C are a schematic perspective view, a schematic side view and a schematic bottom view, respectively, of a beam multiplexer element comprising a vertically mounted beam splitter for a single-level microscope system according to the invention;

DETAILED DESCRIPTION OF THE INVENTION

Figure 1:
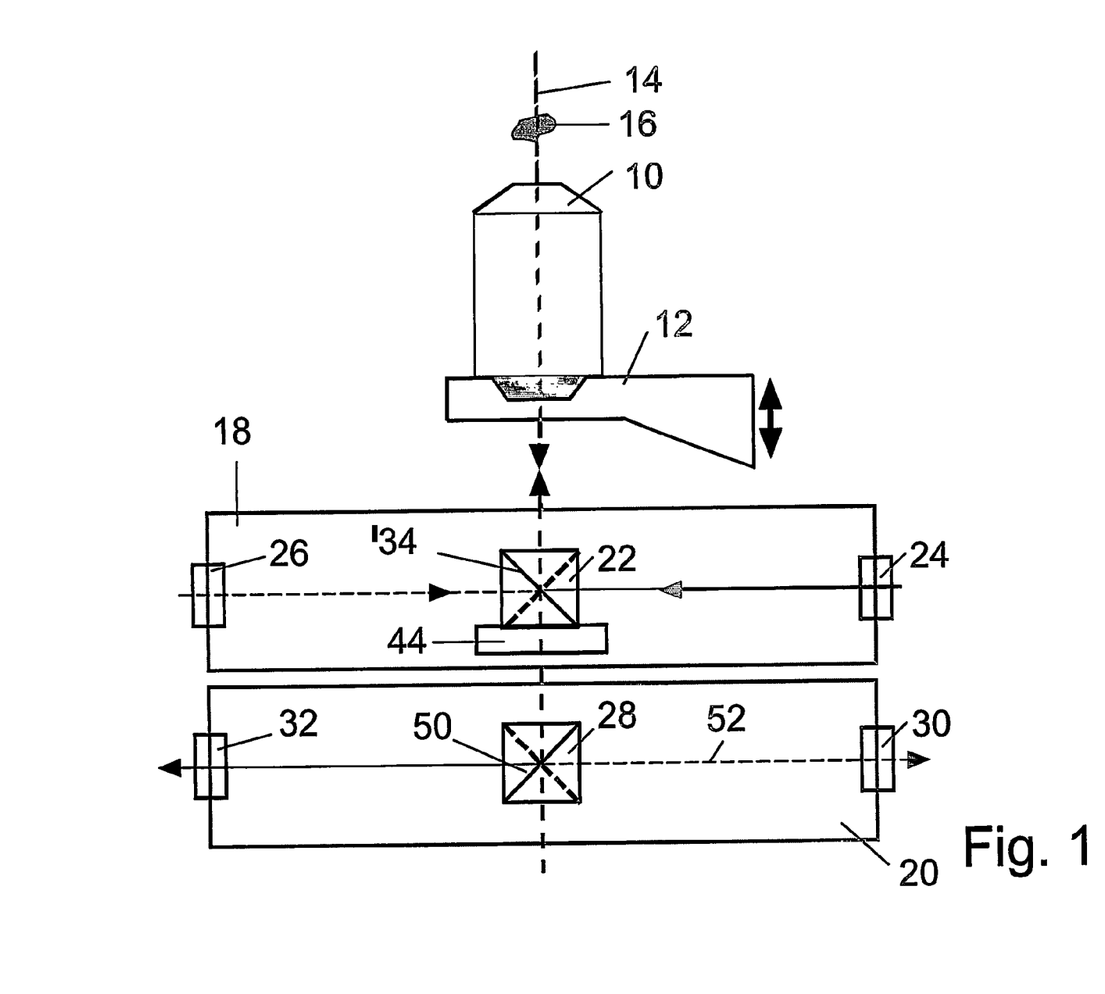
FIG. 1 is a schematic cross-sectional view of a microscope system according to the invention comprising two optical beam hub units.

FIG. 1 shows schematically an example of a microscope system according to the invention. The system comprises an objective lens 10, which is supported by a support 12 and which defines a central optical axis 14 of the microscope system. A sample 16 to be examined is located above the objective lens 10, i.e., the microscope system shown in FIG. 1 is an inverted microscope. However, the present invention is not limited to inverted microscopes, but rather also applies to upright microscopes.

Below the objective lens 10 a first optical beam hub unit 18 and a second optical beam hub unit 20 are arranged in such a manner that the hub units 18, 20 are stacked along the central optical axis 14. The first hub unit comprises at least one beam multiplexer element 22, which is located in the center of the hub. This center lies on the central optical axis 14. In addition, the first hub unit 18 comprises at least two optical beam input ports 24, 26, which are located in a plane perpendicular to the central optical axis 14. The second hub unit 20 likewise comprises at least one beam multiplexer element 28 located in the center of the second hub unit 20 and on the central optical axis 14, and further comprises at least two optical beam output ports 30, 32 which are located in a plane which is perpendicular to the central optical axis 14 and which is axially spaced from the plane of the input ports 24, 26 of the first hub unit 18.

Each input port 24, 26 may comprise a light source, with light sources differing regarding wavelength and bandwidth, coherency/non-coherency, etc. The input ports usually serve for illumination, in particular epi-illumination of the sample. The first hub unit 18 comprises a plurality of such input ports 24, 26, which are arranged radially around the central optical axis 14. The input ports 24, 26 may be arranged asymmetrically or according to a desired symmetry, for example, an octagonal symmetry. In the latter case adjacent input ports radially differ by an angle of 45°.

The output ports 30, 32 of the second hub unit 20 likewise are arranged radially around the central optical axis 14 in an asymmetric or symmetric manner. Each output port 30, 32 may comprise an imaging means, such as an optical detector (for example, a CCD-chip), a video camera or an eyepiece. The detectors of different output ports may differ regarding resolution, sensitivity, size, etc. The output ports usually serve to obtain an optical image of the sample, for example, a transmission image, or a fluorescence image. In an alternative embodiment, at least one of the input ports or output ports may be replaced by a dual input/output port which comprises, for example, both a light source and an optical detector, i.e., a dual input/output port is generally adapted to both receive and transmit an optical beam from and to the optical axis 14. Such dual input/output ports are particularly beneficial in a confocal arrangement.

The beam multiplexer element 22 serves to select or selectively address one of the input ports 24, 26 in such a manner that the optical beam from the respective input port 24, 26 is reflected onto the central optical axis 14 and passes through the objective lens 10 for illuminating the sample 16. In the embodiment shown in FIG. 1, the beam multiplexer element 22 is a beam splitter having an at least partially reflecting surface 34 which is oriented at an angle of 45° relative to the central optical axis 14.

Figure 2:
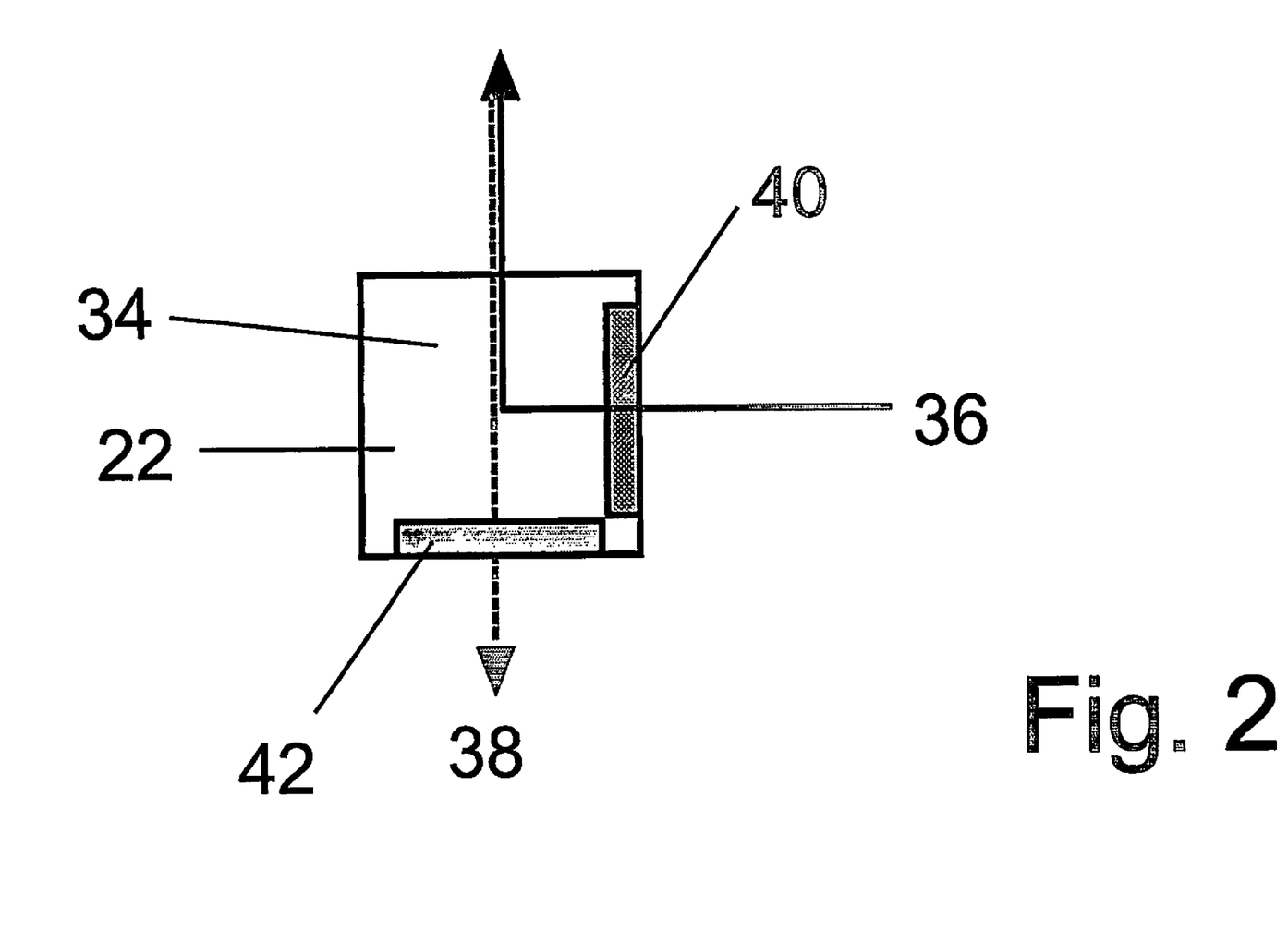
FIG. 2 shows an example of a beam multiplexer element to be used with a microscope system according to the invention.

Preferably, the beam splitter 22 is a dichroic beam splitter cube as shown in FIG. 2. The beam splitter cube 22 of FIG. 2 comprises a dichroic surface 34, which is reflective for the illumination light beam 36 from the input port 24, and which transmits the light beam 38, which is emitted by the sample 16 (the light emitted by the sample 16 usually comprises longer wavelengths than the illumination light 36). In addition, the beam splitter cube 22 may comprise a filter 40, transmitting only illumination light 36, and a filter 42 transmitting only emission light 38.

According to one embodiment, the beam splitter cube 22 is supported by a support 44 in such a manner that it can be rotated around the central optical axis 14 for selecting (or selectively addressing) each one of the input ports 24, 26 of the first hub unit 18. Such rotation may be accomplished, for example, by a drive motor comprising a suitable controller.

In an alternative embodiment, the beam splitter support 44 is designed such that it serves to support a plurality of beam multiplexer elements (such as beam splitters). In this case, the support 44 is designed as a changeover system, which is movable for selectively placing one of the beam multiplexer elements into the central optical axis 14 (i.e., into the center of the first hub unit 18). In such an embodiment, the beam multiplexer elements may differ from each other regarding their orientation relative to the input ports 24, 26, whereby each one of the beam multiplexer elements may assign a specific one of the input ports. In other words, in this embodiment, the respective input port is selected (or addressed) by placing a correspondingly oriented beam multiplexer element into the central optical axis 14.

Figure 3:
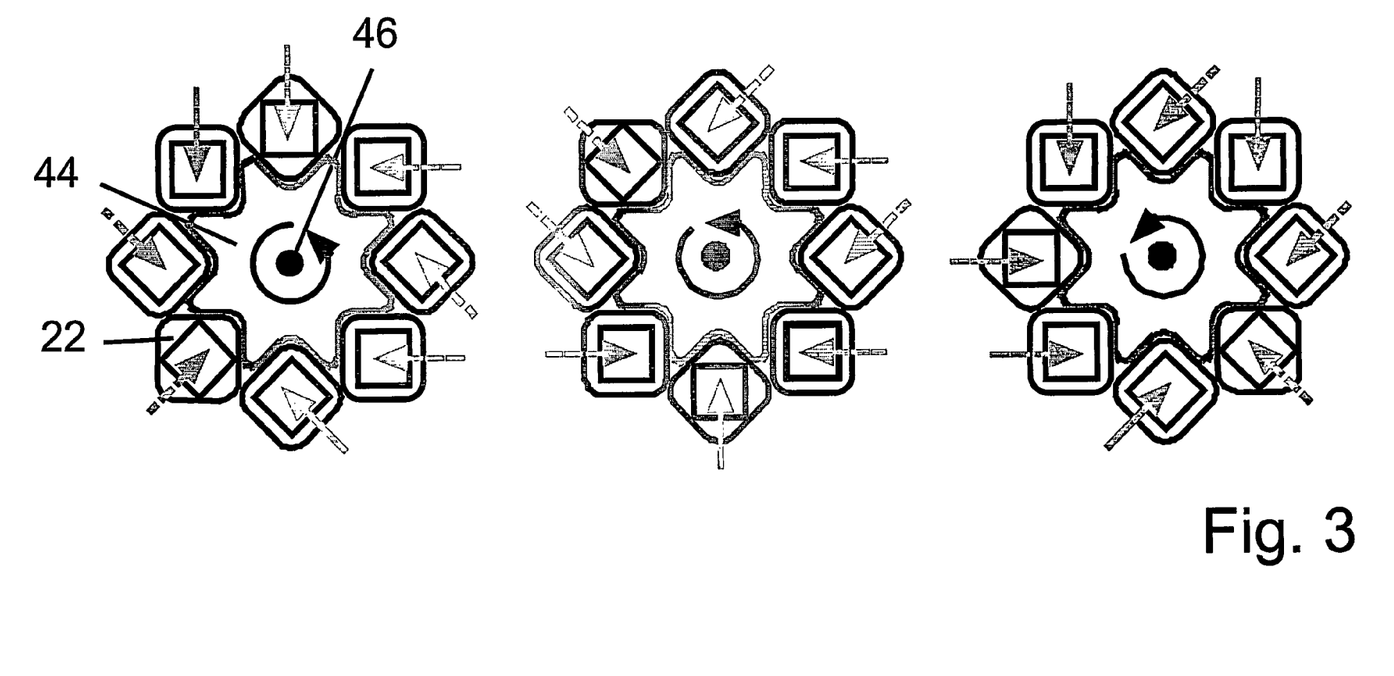
FIG. 3 is a schematic top view of a changeover carousel for selecting a beam multiplexer element to be placed on the central optical axis a microscope system according to the invention, wherein the changeover carousel is shown at three different angular positions.

FIG. 3 shows an example for such a movable support 44 acting as changeover system, wherein the support 44 is designed as a carousel, which is rotatable around an axis 46 running parallel to the central optical axis 14. At its periphery, the carousel 44 carries a plurality of radially spaced beam splitter cubes 22, which may differ regarding the orientation of the dichroic surface 34 with respect to the input ports. The arrows in FIG. 3 denote the illumination light beam 36, with the active beam splitter cube 22 being shown (i.e., that beam splitter cube which is actually placed in the central optical axis 14) with a solid arrow, whereas the non-active beam splitter cubes are shown with dashed arrows. In FIG. 3, three different orientations of the support carousel are shown which are achieved by rotating the carousel 44 around its central axis 46.

In the embodiment of FIG. 3, beam splitter cubes having the same angular orientation may differ regarding their dichroic properties or their polarization. Thus, beam multiplexing may not only occur by direction, but also by, for instance, wavelength or polarization.

With the embodiment of FIG. 3, it is possible to address or select three different radial directions, which differ by 45° each. Hence, in this embodiment the number of addressable beam directions perpendicular to the central optical axis 14 is limited to three, since five out of eight possible directions within a 45° raster are geometrically obstructed, unless neighbors of a particular beamsplitter are left out or their spacing is made very wide, in which case up to five directions may be addressed.

Figure 4A:
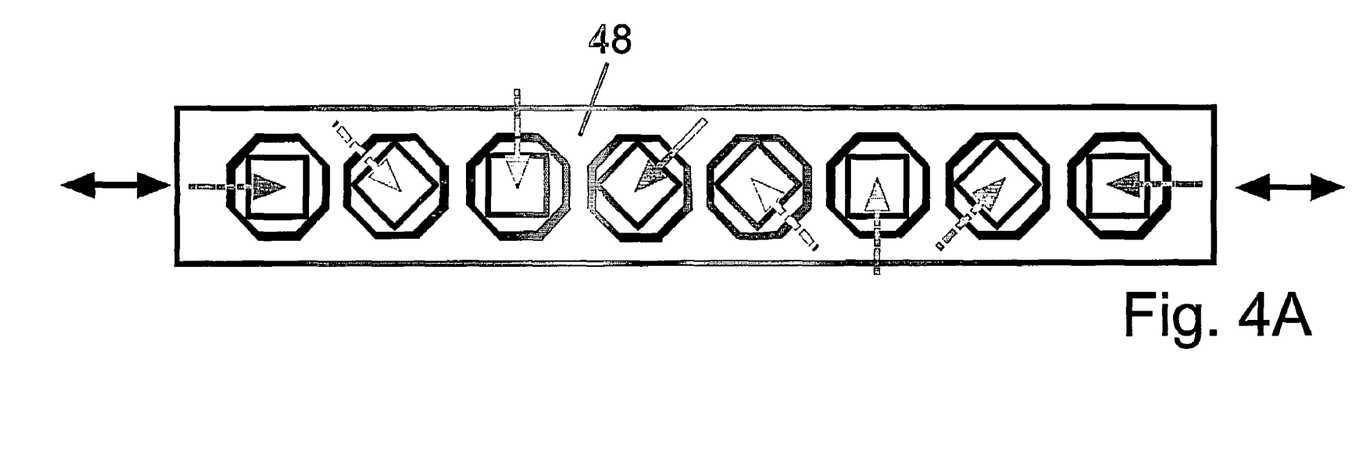
FIG. 4A is a schematic top view of a linearly movable slider carrying beam multiplexer elements for a microscope system according to the invention.

FIG. 4A shows an embodiment wherein this obstruction is at least partially removed. In this embodiment, beam multiplexer elements, e.g., beam splitters 22 are mounted in a row on a linear slider. Each of the beam splitters 22 may assume six different angular orientations regarding the central optical axis 14 for addressing six out of the eight possible directions of a 45° raster, and the two outer ones may even address seven. The slider 48, acting as the support for the beam splitter elements 22, is linearly movable in a direction perpendicular to the central optical axis 14 in order to selectively place one of the beam splitter elements into the central optical axis 14 for selectively addressing one of up to eight different input ports arranged at a 45 degree raster in a plane perpendicular to the optical axis 14. By combining "n" possible orientations of a given beam splitter with "m" possible spectral characteristics, n * m possibilities become possible. Thus, a slider containing "p" elements has, in principle, n * m * p degrees of freedom.

Figure 4B:
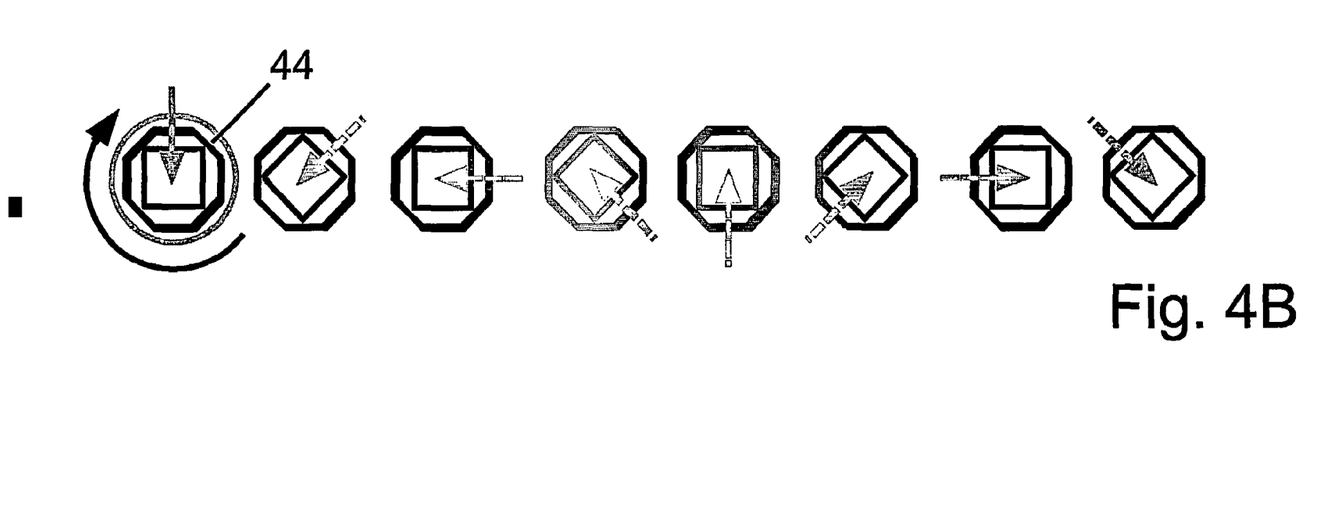
FIG. 4B is a schematic top view of a rotatable beam multiplexer element for a microscope system according to the invention.

FIG. 4B shows a modified embodiment which allows all eight possible directions to be addressed within a 45° raster. This is achieved by providing a single beam splitter element 22 on a support 44, which is rotatable around the central optical axis 14. In FIG. 4B, all possible angular orientations of the beam splitter 22 are shown. With this embodiment, it is possible to address eight input ports arranged in an octagonal pattern, i.e., with ports which are radially spaced by 45 degrees, thereby achieving a fully octagonal symmetry of the microscope system.

In FIG. 3 and FIG. 4A the input beam 36 of the active beam splitter element is shown by a solid arrow, whereas the potential input beams of the non-active beam splitter elements are shown by dashed arrows. In FIG. 4B the solid arrow denotes one chosen orientation, whereas the dashed arrows denote all other possible orientations which can be activated by rotation.

For the beam multiplexer element 28 of the second hub unit 20, the above considerations regarding the beam multiplexer element 22 of the first hub unit 18 apply analogously. In this case, however, the beam multiplexer element 28 comprises a surface 50, which is at least partially reflective for the light emitted from the sample 16 in order to direct an output beam 52 to the selected output port 30, 32. Preferably, the beam multiplexer element 28 is a dichroic beam splitter, i.e., the surface 50, which is inclined by 45° relative to the central optical axis 14 is dichroic for reflecting only a specific spectral range of the light originating from the sample 16 as the output beam 52. Thereby, it is also possible to transmit a specific spectral range of the light emitted from the sample 16 through the beam splitting surface 50 into a further output port (not shown in FIG. 1). Alternatively, light from a further input port (not shown) may pass from below through the beam splitting surface 50 into the objective lens 10. As already mentioned above, the principles for supporting and selecting the beam multiplexer element 22 of the first hub unit 18 discussed in connection with FIGS. 3, 4A and 4B likewise apply to the beam multiplexer element(s) 28 of the second hub unit 20.

With the present invention, beam splitter elements are used not only to separate excitation and emission wavelengths, for example, as in an epi-fluorescence configuration of conventional microscope systems, but in addition, are used for selecting optical input or output ports. Thereby, the beam splitter elements serve as beam multiplexer elements. However, according to the present invention, the beam multiplexer elements need not necessarily be semi-transparent (for example, dichroic) but also may be fully transmitting or fully reflective.

According to the present invention, the beam multiplexer elements, in addition to deflecting an input or an output beam for selecting or addressing one of the optical beam ports on a given hub unit, thereby determining the direction of an input beam or output beam simultaneously, may also serve to modify other physical parameters or properties of the input beam or output beam, such as the spectral composition of the beam (this option is realized when the beam multiplexer element is, for example, a dichroic beam splitter) or the polarization state of the beam.

In general, each beam multiplexer element according to the present invention can be used to establish an optical beam path between the central optical axis of the microscope system and selected ports on a given hub unit or between the center of two adjacent hubs (which centers coincide with the central optical axis of the microscope system) or between different selected ports on a given hub.

In general, the optical beam ports may be arranged asymmetrically or symmetrically with respect to the central optical axis of the microscope system, with an octagonal symmetry being preferred. However, if necessary, an even higher degree of symmetry could be achieved by modifying, for example, the embodiments shown in FIGS. 4A and 4B, accordingly.

In this respect, it is also noted that, when semi-transparent beam splitters are used, in addition to the radial beam directions, an additional axial beam direction can be addressed or selected.

It is further noted that, although the embodiment of FIG. 1 shows two stacked up units 18, 20, the present invention also includes embodiments wherein there is only a single hub unit or wherein there are more than two hub units, with all these hub units being stacked along the central optical axis of the microscope system.

If the microscope system includes only a single hub unit, then the optical beam ports of this hub unit includes at least one input port or at least dual input/output port.

In a microscope system comprising a plurality of hub units preferably that hub unit which is closest to the objective lens serves to select the optical input beam to the microscope system by selecting from different input ports, e.g. from different light sources, whereas the adjacent hub unit serves to direct the light originating from the sample to different output ports, e.g. to different detectors. Stacking of the hub units may occur in several different orientations of the hub units relative to each other based on the symmetry of each hub unit. For example, an octagonal (i.e., eightfold) symmetry of the hub units permits eight different stacking options.

It is noted that, according to the present invention, in general, the output ports need not necessarily comprise an imaging element, such as a detector, and that the input ports need not necessarily comprise a light source. By contrast, the present invention also includes embodiments wherein an output port of a given hub unit, for example, is optically connected with an input port of an adjacent hub unit so that the optical output beam of one hub unit serves as an optical input beam to an adjacent hub unit.

In the embodiments shown in FIGS. 1 to 4B, the beam splitter surface 34, 50 is inclined at an angle of 45° relative to the central optical axis 14 for addressing a beam port arranged in a plane perpendicular to the optical axis 14. However, the present invention also includes embodiments, wherein the at least partially reflecting plane is parallel to the central optical axis, with these embodiments allowing to establish an optical beam path between different beam ports of the same hub unit. On the other hand, such vertically oriented beam splitters also may serve as an alternative for the 45 degrees tilted beam splitters in order to establish an optical beam path between one of the beam ports and the central optical axis 14, as will be discussed later.

Figure 5:
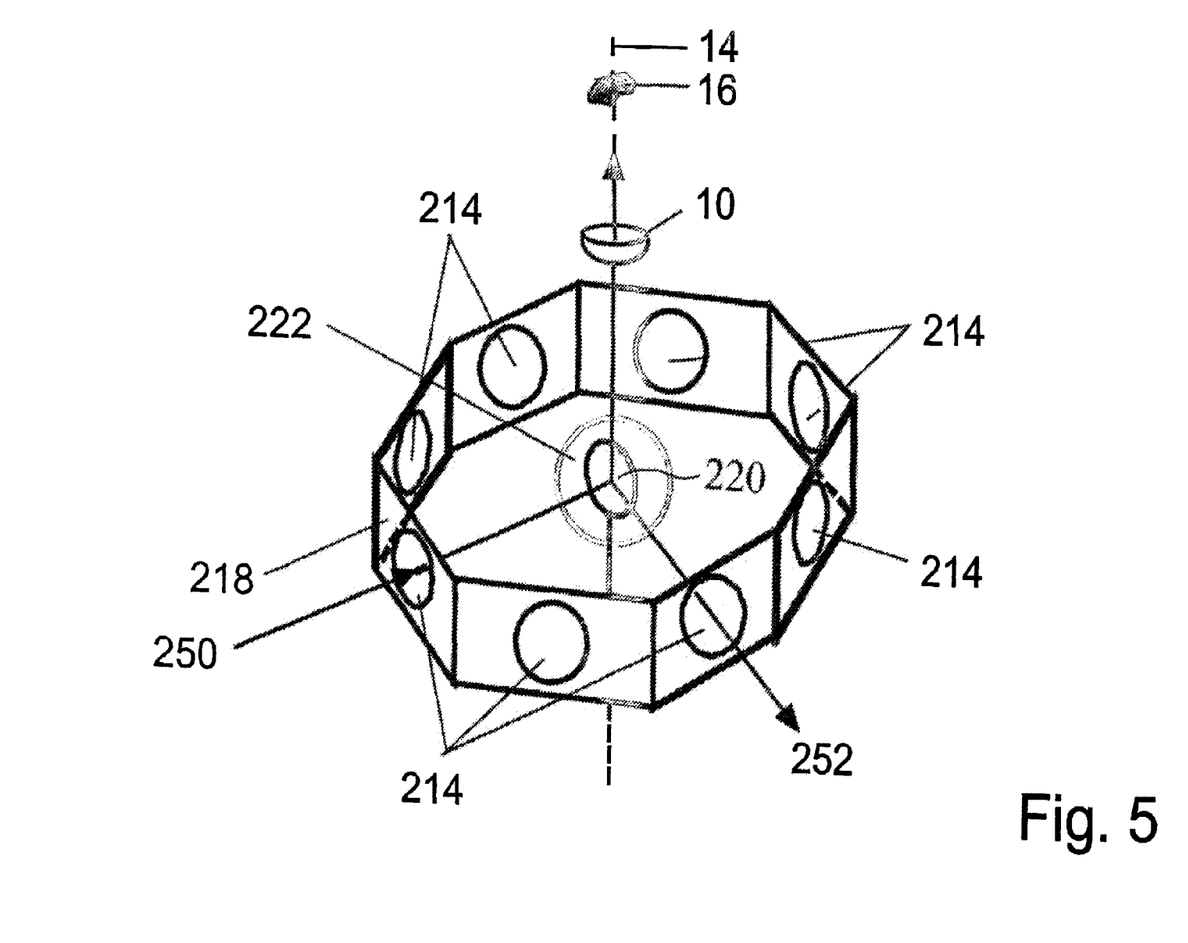
FIG. 5 is a schematic perspective view of a microscope system according to the invention comprising a single optical beam hub unit.

FIG. 5 shows an example of a microscope system according to the invention comprising a single optical beam hub unit 218 only, whereby a most compact design is achieved. The beam hub unit 218 comprises a plurality of beam-ports 214 and a beam multiplexer system 222, which is placed in the center of the beam hub unit 218 on the central optical axis 14 and which is operable for allowing addressing of one or several of these ports 214. In FIG. 5, an example of an output beam is shown at 252 and an example of an input beam is shown at 250. For achieving epi-illumination of the sample 16, input and output beams have to be accommodated within the same beam hub unit 218. This can be afforded in three different ways:

In a scanning system with a "descanned" output beam, the beam multiplexer system 222 may have one or more fully reflective beam multiplexer elements (indicated as 220 in FIG. 5), whose orientation determines through which one of the plurality of ports 214 the input beam enters and the output beam leaves the assembly, with this port serving as a dual input/output port.

Figure 6A:
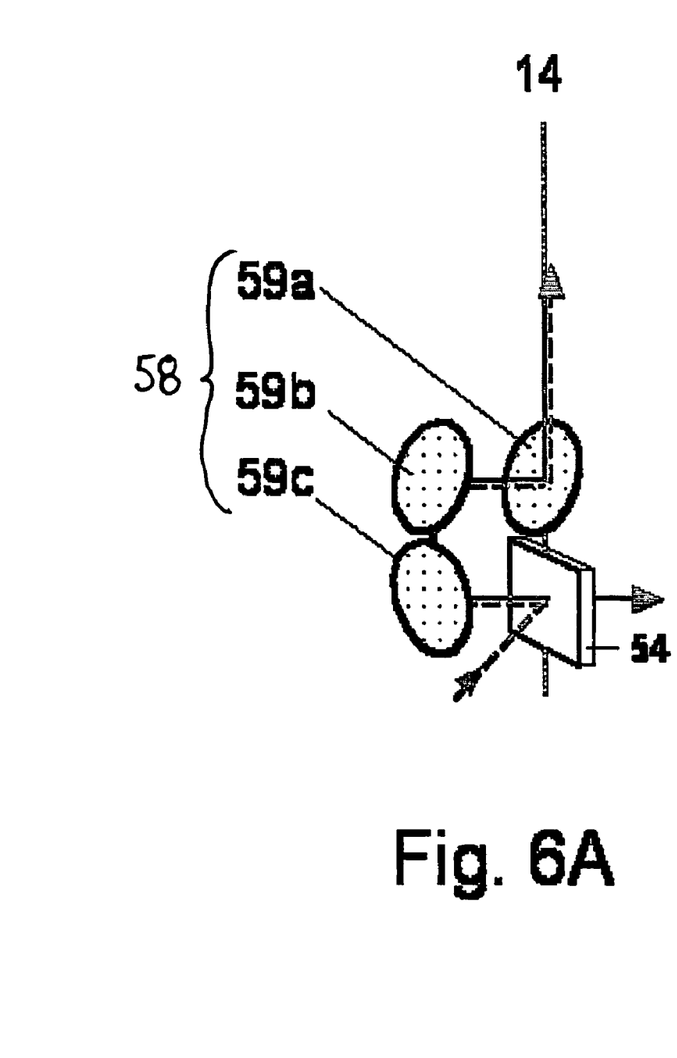
Figure 6B:
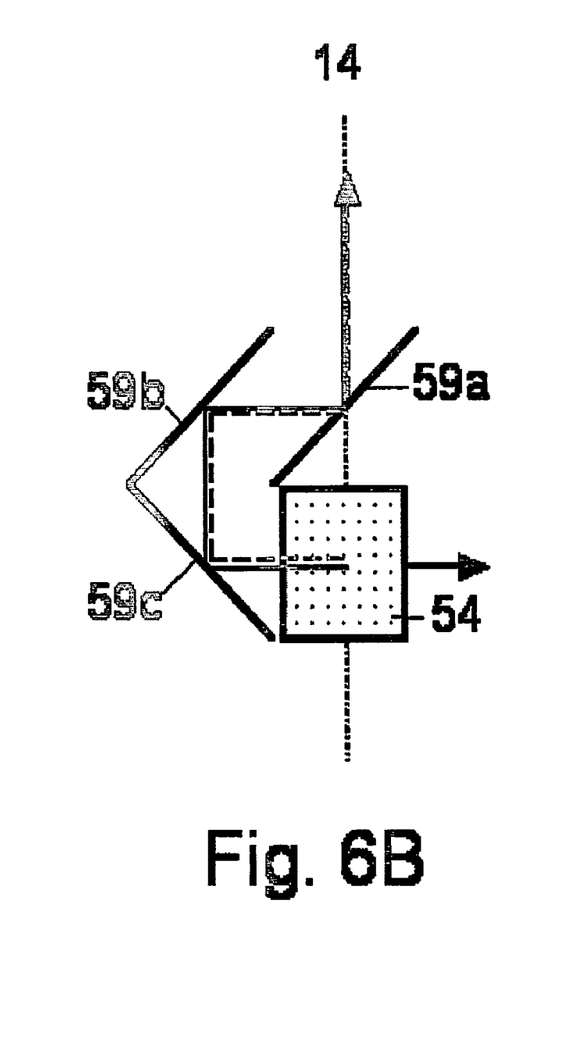

In wide-field epi-mode, separate input and output beam(s) have to be accommodated. The beams pass through different ports of the same beam-hub unit 218 (an example of such situation is given in FIG. 5 by the beams 250 and 252). FIGS. 6A to 6C show an example of a beam multiplexer system 222 comprising at least one vertically oriented beam splitter 54, which is arranged parallel to the central optical axis 14. Given that the central optical axis 14 differs from the direction of the beams 250, 252, when passing through the beam ports 214, the beam multiplexer system 222 comprises an additional beam deflecting element 58, which may be constructed from a combination of mirrors or prisms. The beam splitter 54 may be, e.g., dichroic or polarizing and serves to split into respectively combine two orthogonal beam directions such as the input beam 250 and the output beam 252 within the plane of the ports 214 of the hub unit 218. The beam splitter 54 is arranged at the central optical axis 14. The beam deflecting element 58 serves to deflect an input or output beam such as the beams 250, 252 intersecting the central optical axis 14 at the location of the beam splitter 54 at an angle of e.g. 90° into a direction coinciding with the central optical axis 14. In the example shown in FIGS. 6A to 6C, the beam deflecting element 58 includes three reflecting surfaces such as three mirrors 59a to 59c for achieving this beam deflection.

Figure 7A:
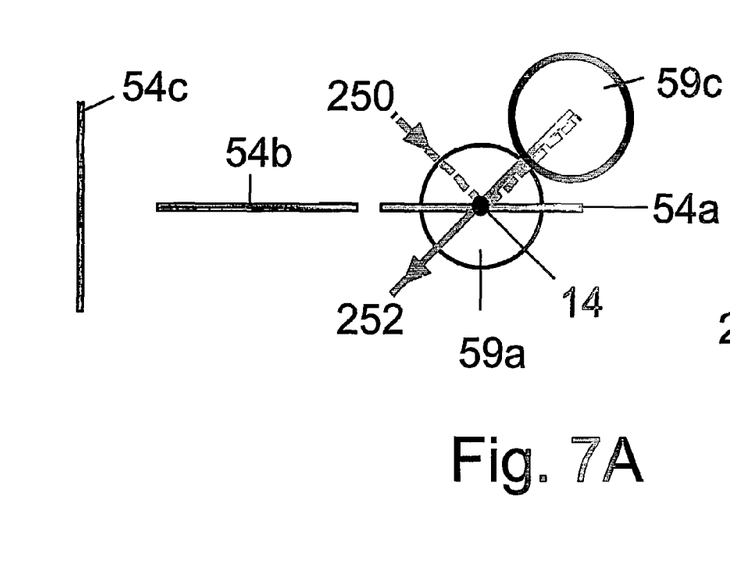
FIGS. 7A and 7B are bottom views of a modified embodiment of the beam multiplexer element of FIGS. 6A through 6C, comprising a changeover slider for selecting different beam splitters.
Figure 7B:
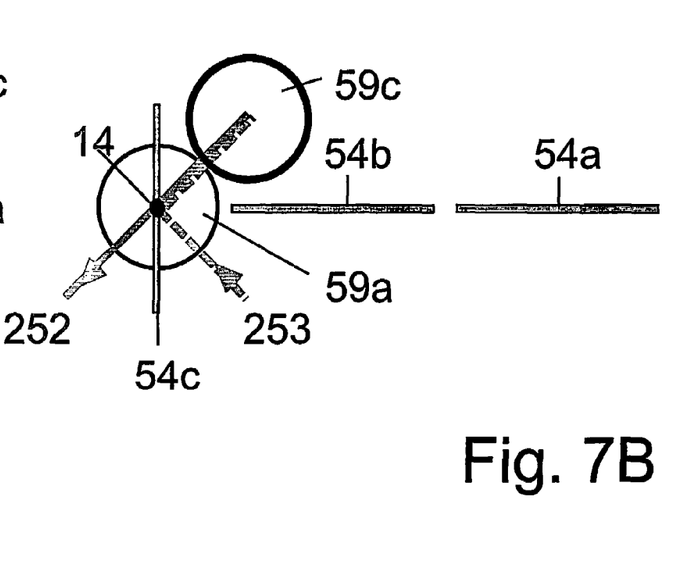

For being able to selectively address different ports 214, according to one embodiment, the beam deflecting element 58 may be rotatable around an axis coinciding with the central optical axis 14, while the orientation of the beam splitter 54 may be fixed. In such case, the beam deflecting element 58 acts as a beam multiplexer element. The beam splitter 54 may be replaceable (for example, by being mounted on a slider) so that different beam splitters having the same orientation but different optical properties, for example, regarding wavelength selectivity or polarization selectivity, can be used. An example is shown in FIGS. 7A and 7B, wherein the two exchangeable beam splitters 54a, 54b, have the same orientation.

In an alternative embodiment, the beam deflection element 58 may be fixed, while the beam splitter 54 may assume different orientations relative to the central optical axis 14 for selectively addressing different ports 214. In such case the beam splitter 54 acts as a beam multiplexer element.

In another alternative embodiment, the beam deflecting element 58 and the beam splitter 54 may be rotated together for selection of the ports 214. In still another alternative embodiment, a plurality of beam splitters may be provided, each being combined with its own beam deflecting element, wherein each beam splitter and its respective beam deflecting element are exchangeable together as a combined unit by being mounted on a slider.

In a further alternative embodiment, at least one of several exchangeable beam splitters may have a (fixed) rotational orientation around the direction of the central optical axis 14 which differs from that of the other beam splitter(s). An example is shown in FIGS. 7A & 7B, wherein the two exchangeable beam splitters 54a, 54b, have the same orientation while a third exchangeable beam splitter 54c has an orientation corresponding to a rotation by 90 degrees around the central optical axis 14 relative to the beam splitters 54a, 54b. The beams splitters 54a to 54c may be mounted on a common slider (not shown). FIG. 7A shows a situation wherein the beam splitter 54a is placed at the center of the hub unit 222 (i.e. in the central optical axis 14) and hence is the active beam splitter deflecting the input beam 250 and transmitting the output beam 252. FIG. 7B shows a situation wherein the beam splitter 54c is placed at the center of the hub unit 222, which still transmits the output beam 252 but now reflects an input beam 253 originating from an input port 214 which is oriented just opposite to the input port of input beam 250. This embodiment is particularly useful for achieving a combination of wide-field and scanning illumination (e.g., for imaging purposes or microdissection). If the beam splitter 54c is partially reflective, it is made possible that the transmitted fraction 252 of the output beam reaches the same detector as in the wide-field configuration. The corresponding signal may be used for documenting the trajectories of the scanning beam. In another embodiment, a mirror might replace the beam splitter 54c.

In FIGS. 8 through 12, various examples for practical applications of the beam multiplexer concept of the present invention are shown.

Figure 8:
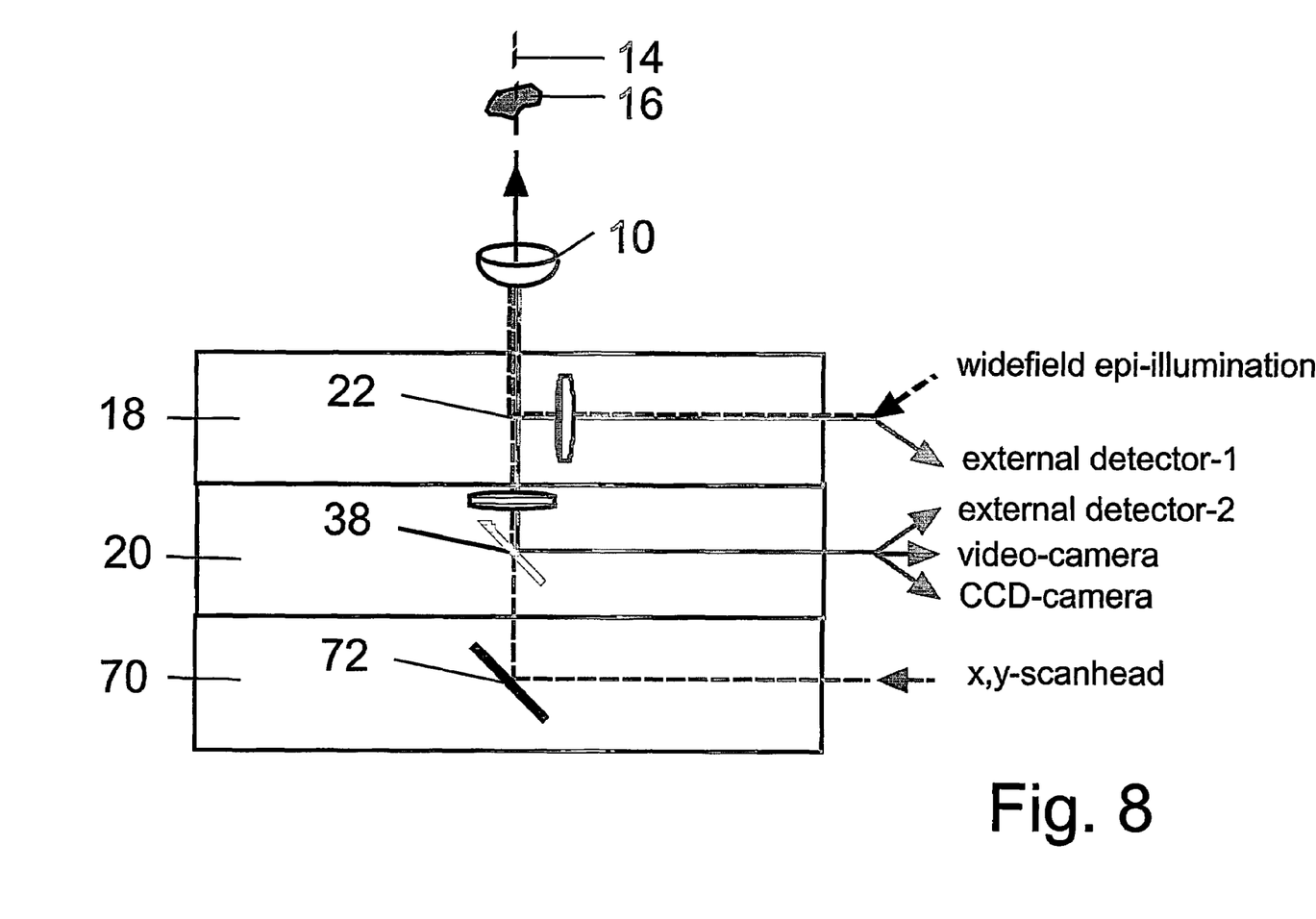
FIG. 8 is a schematic side view of a three-level embodiment of a microscope system according to the invention optimized for multiphoton microscopy.

FIG. 8 shows an example of a three-level microscope system optimized for multiphoton microscopy, which comprises a first level hub unit 18, a second level hub unit 20 and a third level 70. The first level hub unit 18 comprises a beam multiplexer element 22 and at least one input port for epi-fluorescence illumination and one output port for an first external detector. The second hub unit 20 comprises a beam multiplexer element 38 and at least three output ports comprising a second external detector, a video camera and a CCD camera, respectively. The two external detectors can be brought as close as possible to the objective lens 10, and hence, can collect light from a greater virtual field than with conventional microscopes. The video camera may be a contrast enhanced video camera and the CCD camera my be a cooled precision CCD camera, and these cameras may serve as detectors, both with conventional wide field illumination and in conjunction with a two-dimensional scanning laser beam which is provided as an input port to the third level 70 which comprises planar mirror 72 for deflecting the input beam towards the objective lens 10. The beam multiplexer elements 22, 38, each comprise a dichroic beam splitter for transmitting the scanning laser beam, with the first level beam splitter 22, in addition, transmitting part of the light originating from the sample 16.

The beam scanning movement of the scanning laser beam may be correlated with the absolute position of the laser beam as seen by the pixels of CCD camera.

The beam multiplexer element 22, 28, may be realized, for example, according to one of the embodiments shown in FIGS. 3, 4A & 4B.

In general, the stacking feature of the microscope system according to the invention facilitates the folding of a beam inside the microscope, transforming the beam from vertical to horizontal and back to vertical again. Thus, by allowing the beam to interact with more than one beam multiplexer element, the central beam multiplexer selection mechanism permits to switch between a wide variety of microscope configurations, some of which are outlined further below.

Figure 9:
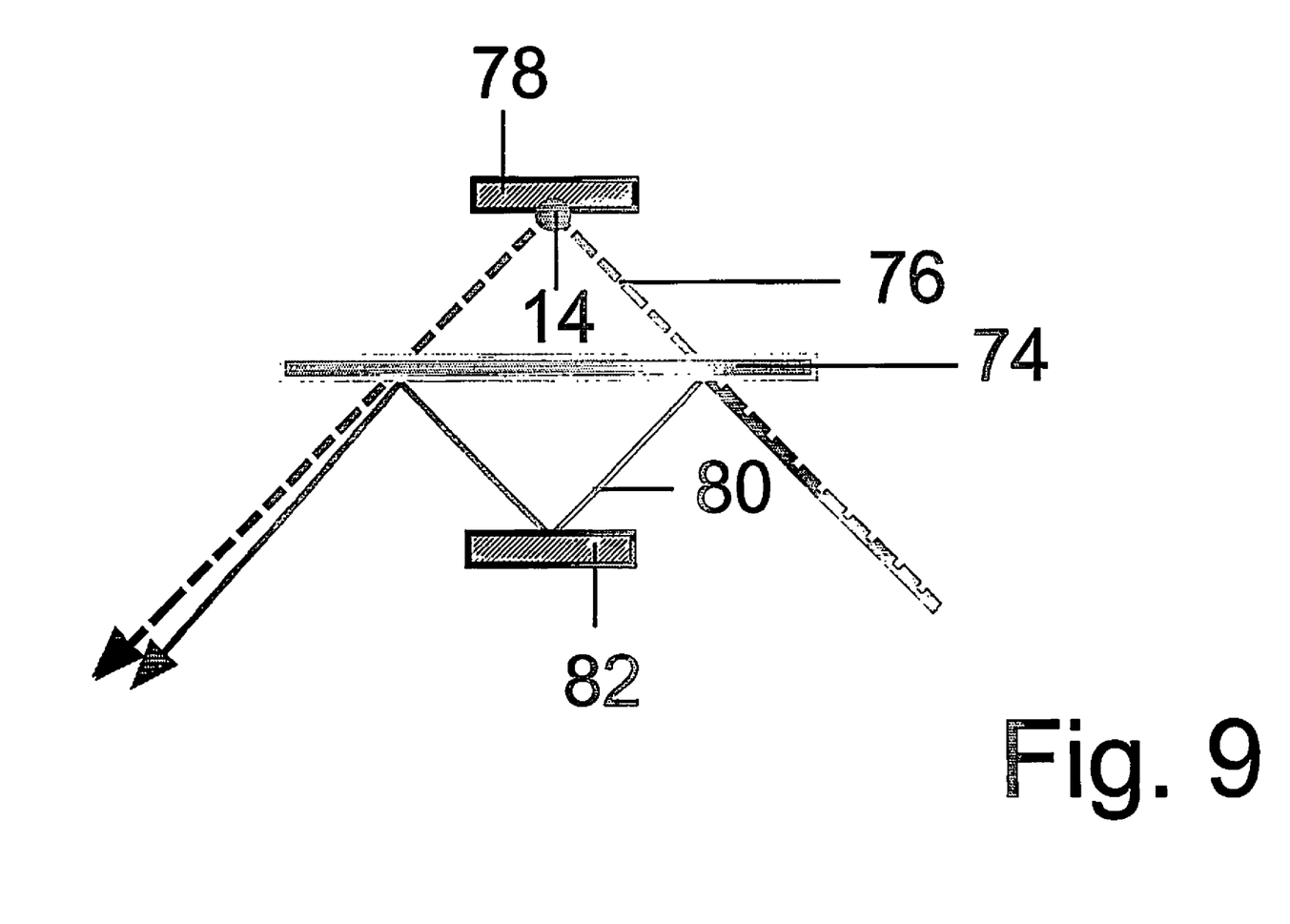
FIG. 9 is a schematic top view of a dual emission imaging system for use with a microscope system according to the invention.

FIG. 9 shows the principle of a dual emission imaging system which uses a variation of the so-called W-view optics as described in U.S. Pat. No. 5,337,081 (which is hereby incorporated by reference) for splitting the emission image of two spectrally distinct partial images projected side by side onto a single CCD chip. The system of FIG. 9 employs a dichroic beam splitter 74 which transmits the light of the first partial image and which reflects the light of the second partial image. The light beam 76 of the first partial image is reflected at a first mirror 78 which is oriented upright at the central optical axis 14 of the microscope system. The light beam 80 of the second partial image is reflected at a mirror 82 which is oriented parallel to the first mirror 78. The resulting output beams are slightly divergent and hence are slightly shifted relative to each other on the detector.

Figure 10:
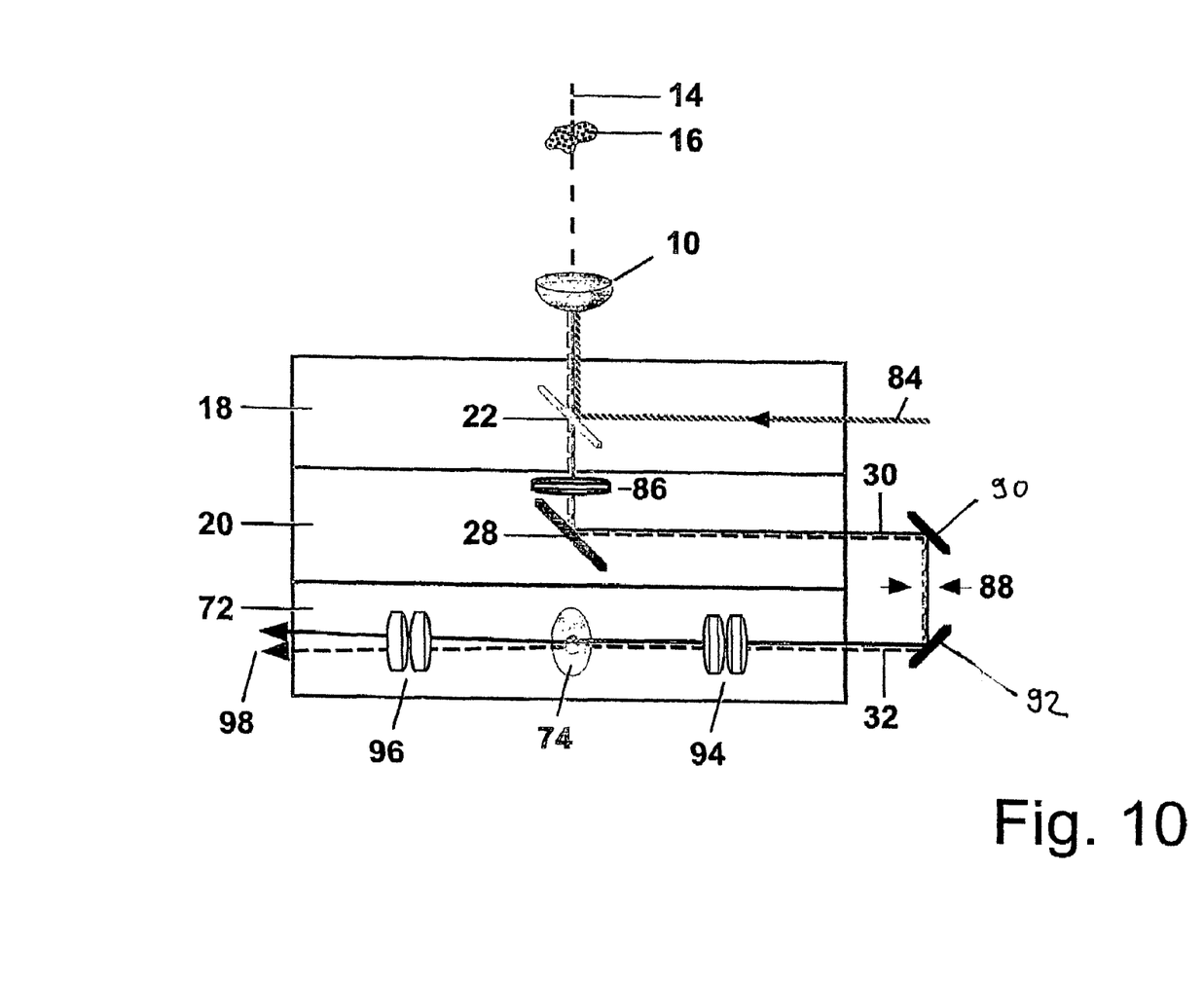
FIG. 10 is a schematic side view of a microscope system utilizing the dual imaging system of FIG. 9.

FIG. 10 shows a microscope system employing such a dual emission imaging system. The system of FIG. 10 comprises a first level hub unit 18 with an input beam multiplexer element 22, a second level hub unit 20 comprising a beam multiplexer element 28 and a third level 72 comprising the dual emission imaging system of FIG. 9 including the dichroic beam splitter 74.

The first level beam multiplexer element 22 is a dichroic beam splitter for deflecting an epi-fluorescence illumination beam 84 onto the sample 16. The second level beam multiplexer element 28 is a mirror, with a tube lens 86 being arranged at the central optical axis 14 between the beam multiplexer elements 22, 28. The tube lens 86 and the mirror 28 serve to produce an intermediate image, the dimensions of which can be determined using an adjustable slit device 88 which is arranged between an output port 90 of the second level hub unit and an input port 92 of the third level 72.

The system of FIG. 10 is an example wherein an output port of one level is optically connected to an input port of an adjacent level. The third level 72 comprises an optical relays system 94 for forming an image of the intermediate image plane in infinity. Between this system 94 and a further optical system 96 which refocuses the beam again, thereby forming a finite image of the detector which is provided at an output port 98 of the third level 72, the beam is split into spectrally distinct portions by the system shown in FIG. 9, including the dichroic beam splitter 74, whereby the beam, after having been spectrally split by the beam splitter 74, is recombined again with the help of the beam splitter 74, but with slightly different directions for the to beams. This, in turn, leads to the desired separation of the partial images on the detector.

The system of FIGS. 9 & 10 is particularly suited for Fluorescence Resonance Energy Transfer (FRET) experiments, wherein the emitted light beam is split into two differently colored beams, which form two differently colored images side-by-side on a single detector. Given that the central optical axis of the lowest beam hub level coincides with a conjugate plane of the exit pupil of the objective lens, masks can be brought into the beam at this position, and hence, can be used for contrast purposes. One example is the use of phase rings for phase contrast microscopy. When brought into the position of the beamsplitter 74, phase contrast may be obtained without the need for a special phase contrast objective.

Figure 11:
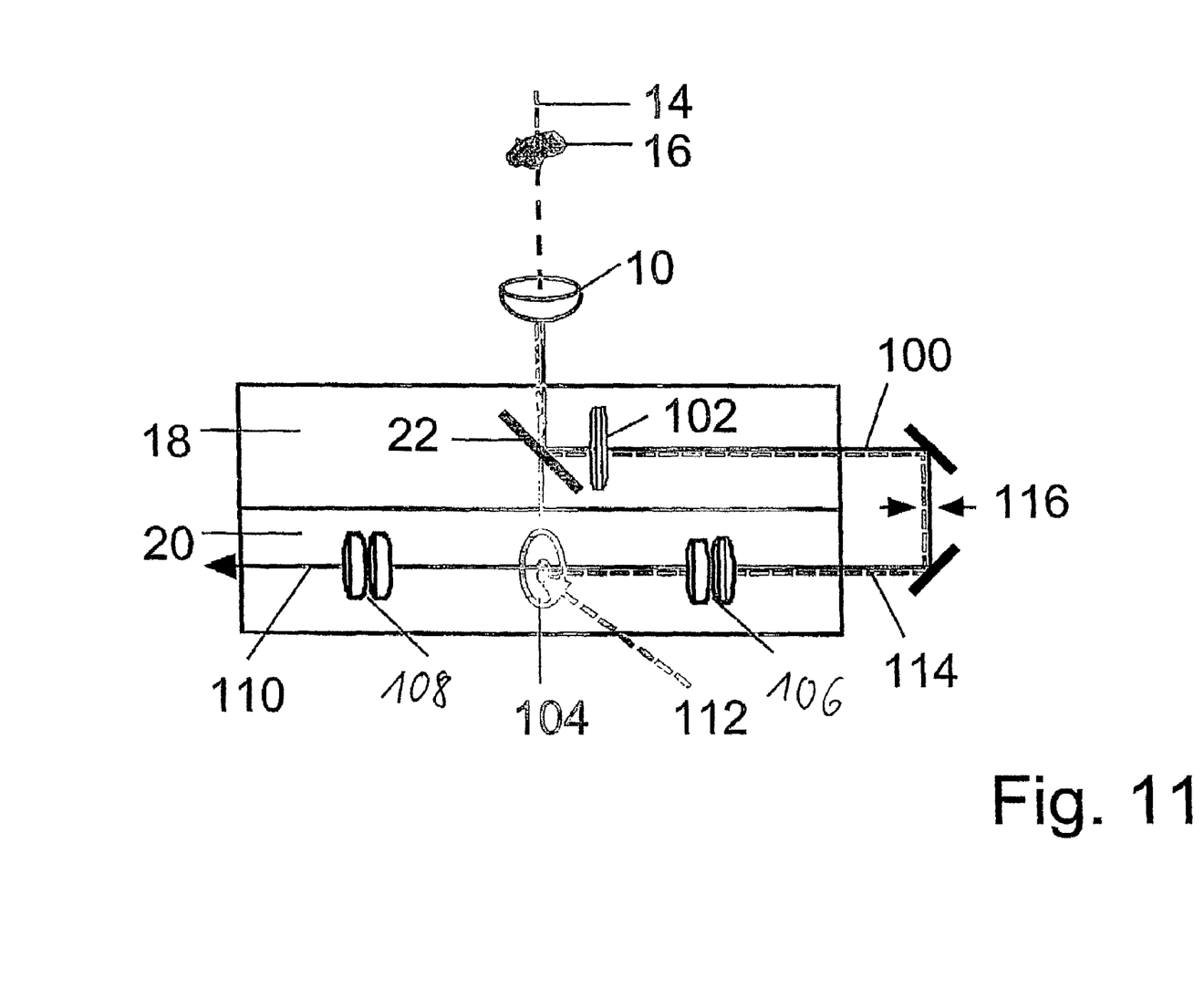
FIG. 11 is a schematic side view of a microscope system of the invention designed as a Nipkow confocal system.
Figure 12:
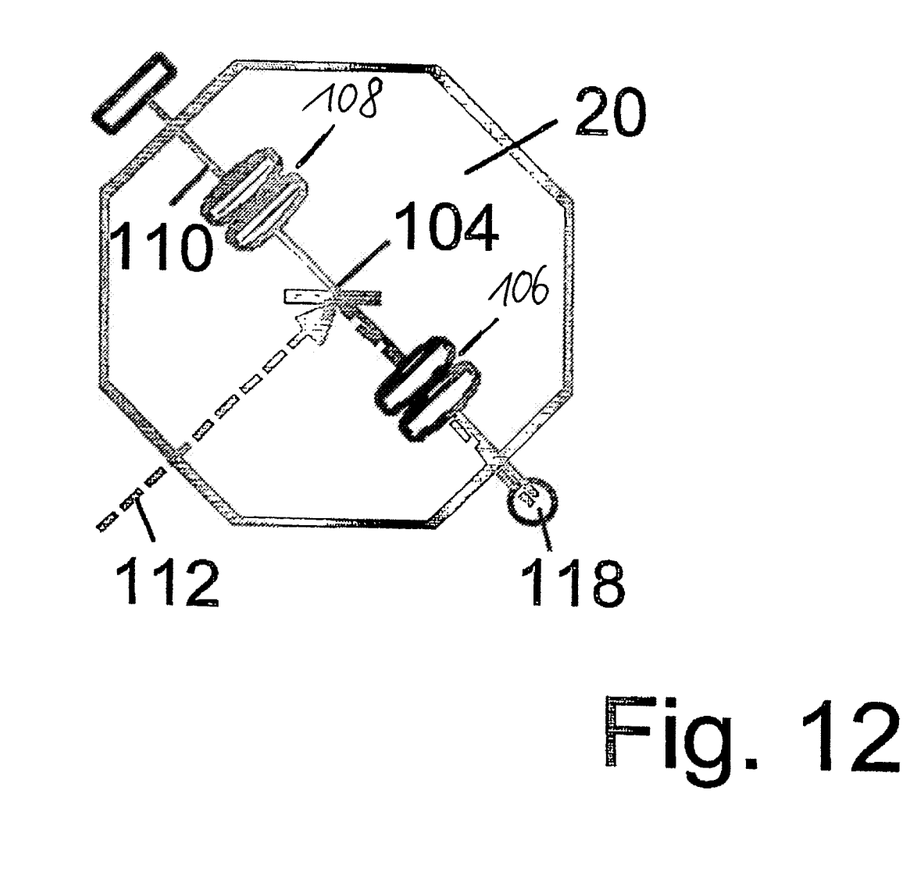
FIG. 12 is a schematic top view of the system of FIG. 11, wherein only the lower hub unit is shown.

FIGS. 11 & 12 show an example of a microscope system designed as a Nipkow confocal system for multi-spot confocal imaging using a wide-field area sensor. The system comprises a first level hub unit 18 and a second level hub unit 20. The first level hub unit 18 includes a beam multiplexer element 22 which is designed as a mirror for deflecting an input beam from a dual input/output port 100 towards the objective lens 10 and for deflecting the emitted light from the sample 16 towards the dual input/output port 100, with a first optical element 102 being located between the mirror 22 and the dual input/output port 100. The second level hub unit 20 comprises a dichroic beam splitter 104, which is arranged in an upright position on the central optical axis of the microscope system. The dichroic beam splitter 104 is arranged between a second optical element 106 and a third optical element 108. The second level hub unit 20 further includes an output port 110 with an image detector, an input port 112 for epi-fluorescence illumination and a dual input/output port 114, which is optically connected with the dual input/output port 100 of the first level hub unit 18.

A Nipkow mask 116 is arranged between the input/output port 100 of the first level hub unit 18 and the input/output port 114 of the second level hub unit 20, with a deflection mirror 118 being provided at the input/output port 114. The first optical element 102 serves to create an intermediate image at the Nipkow mask 116. The second optical element 106 serves to form an image of the intermediate plane in infinity, with the third optical element 106 refocusing the beam again in order to form a finite image on the detector of the output port 110. The dichroic beam splitter 104 serves to reflect the epi-fluorescence illumination light towards the input/output port 114 of the second level hub 20 for illuminating the sample 16, while transmitting the emitted light from the sample 16 towards the output port 110.

The Nipkow mask 116 can either be moved on a circular path such as to illuminate all parts of the image zone equally long, or it can be moved merely in a linear fashion direction, which serves the same purpose as long as the point pattern is chosen accordingly. For higher light throughput suitable slit-patterns may also be used.

As already mentioned above, all of the shown configurations are not restricted to an inverted microscope system, while the same symmetry may also be applied to an upright microscope system or a combination of an upright and an

What is claimed is:

1. A microscope system, comprising:
an objective lens defining a central optical axis of the microscope system;
an optical beam hub unit having a center coinciding with said central optical axis, a plurality of optical beam ports arranged in a 45 degrees raster radially around said central optical axis, a beam multiplexer system arranged in the center of the hub unit, and means for rotating the beam multiplexer system around said central optical axis in a 45 degrees raster with respect to said central optical axis for alternatively selecting at least one of the beam ports;
wherein said optical beam ports include at least two elements selected from the group consisting of input ports, output ports and dual input/output ports.

2. The microscope system according to claim 1, wherein said beam ports include at least one input port or at least one dual input/output port.

3. The microscope system according to claim 1, wherein the beam multiplexer system serves to establish a beam path between the selected at least one of the optical beam port and said central optical axis.

4. The microscope system according to claim 1, wherein the microscope system has an octagonal symmetry regarding the central optical axis.

5. The microscope system according to claim 1, wherein the beam multiplexer system is selected from the group consisting of beam splitters, mirrors and frilly transmitting elements.

6. The microscope system according to claim 1, wherein the beam multiplexer system comprises a dichroic beamsplitter.

7. The microscope system according to claim 1, wherein the beam multiplexer system comprises an at least partially reflecting planar surface which is oriented at an angle of 45 degrees with respect to the central optical axis.

8. The microscope system according to claim 1, wherein the beam multiplexer system comprises a beam splitter having an at least partially reflecting planer surface, which is oriented parallel to the central optical axis.

9. The microscope system according to claim 8, wherein the beam multiplexer system comprises a beam deflecting element adapted for deflecting an optical beam on the central optical axis into a direction perpendicular to the central optical axis towards the beam splitter for passage to one of the beam ports via the beam splitter, and wherein said beam deflecting element is also adapted to deflect an optical beam oriented perpendicular to the central optical axis and passing from one of the beam ports via the beam splitter to the deflecting element into a direction coinciding with the central optical axis.

10. The microscope system according to claim 9, wherein said beam deflecting element is rotatable around the central optical axis for said selection of at least one of the beam ports.

11. The microscope system according to claim 8, wherein said beam splitter is rotatable around the central optical axis for said selection of at least one of the beam ports.

12. A microscope system according to claim 1, wherein said at least two elements selected from the group consisting of input ports, output ports and dual input/output ports comprises input ports, and wherein at least part of the input ports is for epi-illumination of a sample.

13. A microscope system according to claim 1, wherein said at least two elements selected from the group consisting of input ports, output ports and dual input/output ports comprises output ports, and wherein at least part of the output ports is for imaging a sample on a plurality of detectors, each of said output ports being associated to one of the detectors.

14. A microscope system according to claim 1, wherein said at least two elements selected from the group consisting of input ports, output ports and dual input/output ports comprises dual input/output ports, and wherein at least part of the dual input/output ports is for a confocal setup.

15. A microscope system comprising
an objective lens defining a central optical axis of the microscope system;
an optical beam hub unit having a center coinciding with said central optical axis, a plurality of optical beam ports arranged radially around said central optical axis, a beam multiplexer system arranged in the center of the hub unit and means for operating said multiplexer system for alternatively selecting at least one of the optical beam ports in a 45 degrees raster;
wherein said beam ports include at least one input port or at least one dual input/output port;
wherein said beam multiplexer system comprises a plurality of different beam multiplexer elements and means for placing alternatively each one of said beam multiplexer elements in the center of the hub unit for alternatively selecting each one of the beam ports;
wherein said means for placing comprises a slider carrying the beam multiplexer elements, said slider being movable in a direction perpendicular to the central optical axis;
wherein at least one of the beam ports is oriented at an angle of 45 degrees with regard to said movement direction of said slider,
wherein at least some of the beam multiplexer elements are dichroic, and
wherein at least two of the dichroic beam multiplexer elements are for selecting the same one of the beam ports, but have a different wavelength selectivity.

16. The microscope system according to claim 15, wherein the respective beam multiplexer element serves to establish a beam path between the selected optical beam port and said central optical axis.

17. A microscope system according to claim 15, wherein said means for placing alternatively each one of a plurality of different beam multiplexer elements into the center of the hub unit comprises a carousel carrying the beam multiplexer elements, said carousel being rotatable around its center.

18. The microscope system according to claim 17, wherein each beam multiplexer element is adapted to be mounted at the carousel in at least two different orientations.

19. The microscope system according to claim 15, wherein the microscope system has an octagonal symmetry relative to the central optical axis.

20. The microscope system according to claim 15, wherein the beam multiplexer elements are selected from the group consisting of beam splitters, mirrors and fully transmitting elements.

21. The microscope system according to claim 15, wherein at least some of the beam multiplexer elements are dichroic.

22. The microscope system according to claim 15, wherein at least some of the beam multiplexer elements comprise an at least partially reflecting plane surface which is oriented at an angle of 45° with respect to the central optical axis.

23. The microscope system according to claim 15, wherein at least some of the beam multiplexer elements comprise a beam splitter having an at least partially reflecting plane surface which is oriented parallel to the central optical axis.

24. The microscope system according to claim 23, wherein the beam multiplexer system comprises a beam deflecting element adapted for deflecting an optical beam on the central optical axis into a direction perpendicular to the central optical axis towards the beam splitter for passage to one of the beam ports via the beam splitter, and wherein said beam deflecting element is also adapted to deflect an optical beam oriented perpendicular to the central optical axis and passing from one of the beam ports via the beam splitter to the deflecting element into a direction coinciding with the central optical axis.

25. A microscope system according to claim 15, wherein said at least one input port or at least one dual input/output port comprises input ports; and
wherein at least part of the input ports is for epi-illumination of a sample.

26. A microscope system according to claim 15, wherein said at least one input port or at least one dual input/output port comprises dual input/output ports, and wherein at least part of the output ports of the dual input/output ports is for imaging a sample on a plurality of detectors, each of said output ports being associated to one of the detectors.

27. A microscope system according to claim 15, wherein said at least one input port or at least one dual input/output port comprises dual input/output ports, and wherein at least part of the dual input/output ports is for a confocal setup.

28. A microscope system comprising
an objective lens defining a central optical axis of the microscope system;
a plurality of optical beam hub units arranged on the same side of the objective lens, each having a center coinciding with said central optical axis, a plurality of optical beam ports arranged radially around said central optical axis, a beam multiplexer system arranged in the center of the hub unit, and means for operating said multiplexer system for alternatively selecting at least one of the beam ports;
wherein said optical beam hub units are stacked along said central optical axis, and
wherein said beam ports of each optical beam hub unit include at least two elements selected from the group consisting of input ports, output ports and dual input/output ports.

29. The microscope system according to claim 28, wherein said means for operating said multiplexer system comprise one of a means for rotating a beam multiplexer element arranged in the center of the hub unit around said central optical axis and a means for placing alternatively one of a plurality of different beam multiplexer elements into the center of the hub unit.

30. The microscope system according to claim 29, wherein the respective beam multiplexer element serves to establish a beam path between the selected optical beam port and said central optical axis or between the selected optical beam port and another one of said plurality of beam ports of the same hub unit or between the centers of two adjacent ones of said plurality of hub units.

31. A microscope system according to claim 29, wherein said means for placing alternatively each one of a plurality of different beam multiplexer elements into the center of the hub unit comprises a carousel carrying the beam multiplexer elements, said carousel being rotatable around its center.

32. A microscope system according to claim 31, wherein each beam multiplexer element is adapted to be mounted at the carousel in at least two different orientations.

33. A microscope system according to claim 31, wherein said means for rotating said beam multiplexer element comprises a driving motor.

34. A microscope system according to claim 29, wherein each beam multiplexer element is selected from the group consisting of beam splitters, mirrors and fully transmitting elements.

35. The microscope system according to claim 28, wherein said means for operating said multiplexer system comprise a means for placing alternatively each one of a plurality of different beam multiplexer elements into the center of the hub unit, and wherein said means for placing comprises a slider carrying the beam multiplexer elements, said slider being movable in a direction perpendicular to the central optical axis.

36. A microscope system according to claim 35, wherein each beam multiplexer element is adapted to be mounted on the slider in at least two different orientations.

37. A microscope system according to claim 28, wherein the microscope system has an octagonal symmetry regarding the central optical axis.

38. A microscope system according to claim 28, wherein at least one of the beam multiplexer elements is dichroic.

39. A microscope system according to claim 28, wherein at least one of the beam multiplexer elements comprise an at least partially reflecting plane surface, which is oriented at an angle of 45 degrees with respect to the central optical axis.

40. A microscope system according to claim 28, wherein at least one of the beam multiplexer elements comprises an at least partially reflecting plane surface, which is oriented parallel to the central optical axis.

41. A microscope system according to claim 28, wherein the ports of that hub unit which is closest to the objective lens, comprise at least two input ports or at least two dual input/output ports or at least one input port and at least one dual input/output port.

42. A microscope system according to claim 28, wherein said at least two elements selected from the group consisting of input ports, output ports and dual input/output ports comprises input ports, and wherein at least part of the input ports is for epi-illumination of a sample.

43. A microscope system according to claim 28, wherein said at least two elements selected from the group consisting of input ports, output ports and dual input/output ports comprises output ports, and wherein at least part of the output ports is for imaging a sample on a plurality of detectors, each of said output ports being associated to one of the detectors.

44. A microscope system according to claim 28, wherein said at least two elements selected from the group consisting of input ports, output ports and dual input/output ports comprises dual input/output ports, and wherein at least part of the dual input/output ports is for a confocal setup.

* * * * *